United States Patent [19]
Kanemori et al.

[11] Patent Number: 5,434,686
[45] Date of Patent: Jul. 18, 1995

[54] ACTIVE MATRIX DISPLAY DEVICE

[75] Inventors: Yuzuru Kanemori, Tenri; Akihiko Imaya; Hiroaki Kato, both of Nara; Kozo Yano, Yamatokoriyama; Katsumi Irie, Gojo, all of Japan

[73] Assignee: Sharp Kabushiki Kaisha, Japan

[21] Appl. No.: 123,847

[22] Filed: Sep. 9, 1993

Related U.S. Application Data

[63] Continuation of Ser. No. 878,388, May 5, 1992, abandoned.

[30] Foreign Application Priority Data

May 8, 1991 [JP] Japan ................. 3-102365

[51] Int. Cl.[6] ............................ G02F 1/1343
[52] U.S. Cl. ............................ 359/59; 345/93
[58] Field of Search ............... 359/59; 345/92, 93

[56] References Cited

U.S. PATENT DOCUMENTS

| | | | |
|---|---|---|---|
| 4,753,518 | 6/1988 | Clerc | 359/59 |
| 4,775,861 | 10/1988 | Saito | 359/59 |
| 4,890,097 | 12/1989 | Yamashita et al. | 359/68 |
| 4,968,119 | 11/1990 | Stewart | 359/59 |
| 5,062,690 | 11/1991 | Whetton | 359/59 |
| 5,121,236 | 6/1992 | Ukai et al. | 359/59 |
| 5,343,216 | 8/1994 | Katayama et al. | 359/59 |

FOREIGN PATENT DOCUMENTS

| | | |
|---|---|---|
| 0365244 | 4/1990 | European Pat. Off. . |
| 0372898 | 6/1990 | European Pat. Off. . |
| 0381428 | 8/1990 | European Pat. Off. . |
| 2-124538 | 5/1990 | Japan . |
| 3-24524 | 2/1991 | Japan . |
| 3033724 | 2/1991 | Japan ................. 359/59 |
| 4-16929 | 1/1992 | Japan . |
| 4-16930 | 1/1992 | Japan . |
| 4-19618 | 1/1992 | Japan . |

*Primary Examiner*—William L. Sikes
*Assistant Examiner*—Ron Trice
*Attorney, Agent, or Firm*—Nixon & Vanderhye

[57] ABSTRACT

An active matrix display device comprising two pixel electrodes in each rectangular area defined by adjacent signal lines and adjacent scanning lines. The pixel electrodes disposed across each signal line are connected with respective switching elements, which are connected to the common scanning line and the common signal line. In this way, each pixel electrode has only one signal line formed on one side thereof. As a result, a line defect conventionally produced by a leakage between adjacent signal lines through a pixel electrode is prevented. Further, a defective pixel can be easily corrected by short-circuiting the pixel electrode with the adjacent signal line.

5 Claims, 8 Drawing Sheets

ACTIVE MATRIX DISPLAY DEVICE

This is a continuation of application Ser. No. 07/878,388, filed May 5, 1992, now abandoned.

BACKGROUND OF THE INVENTION

1. Field of the Invention

The present invention relates to a display device for effecting a display by applying a drive signal to a pixel electrode through a switching element, and more particularly, relates to an active matrix display device in which a plurality of pixel electrodes are arranged in a matrix so as to effect a high density display.

2. Description of the Prior Art

Conventionally, in a liquid crystal display device, an EL (electro luminescence) display device, a plasma display device, and the like, a display pattern is formed on a screen thereof by selectively driving pixel electrodes arranged in a matrix.

Such selective driving of the pixel electrodes can be effected by a known active matrix drive system, in which individual pixel electrodes are connected to their respective switching elements so as to be driven independently. For the switching elements, TFTs (thin film transistors), MIM (metal-insulator-metal) elements, MOS (metal-oxide-semiconductor) transistors, diodes, varistors, or the like can be used. Each switching element switches the application of a voltage between the corresponding pixel electrode and a counter electrode facing the pixel electrode, so as to optically modulate a display medium, such as a liquid crystal, an EL layer, and a plasma emitter, interposed between the electrodes. Such optical modulation is visually recognized as a display pattern. This active matrix drive system can effect a display of high contrast, and therefore, has been applied to, for example, a liquid crystal television set, a word processor, and a computer terminal display device.

In the above conventional active matrix display devices, when a switching element is defective, a pixel electrode connected to the switching element can not receive an otherwise applied signal. As a result, the pixel with such a pixel electrode is recognized as a point defect on the display screen. Such a point defect deteriorates the quality of the display, and the yield of manufacture is lowered.

Generally, the inferiority of a pixel including a point defect and a line defect is largely caused by the following two reasons: (1) a pixel electrode can not be sufficiently charged when a switching element is on (hereinafter referred to as an "ON defect", and (2) the charge in a pixel electrode is leaked when a switching element is off (hereinafter referred to as an "OFF defect").

The ON defect is caused by a defective switching element. On the other hand, the OFF defect is caused by two types of electrical leakages; a leakage between a pixel electrode and a source bus through a switching element, and a leakage between a pixel electrode and a source bus or a gate bus. In either case of the ON defect or the OFF defect, the voltage applied between the pixel electrode and the counter electrode does not reach a required value. As a result, the point defect is observed as a luminescent spot on the display screen when a normally white mode (a display mode in which the light transmittance is maximum when the voltage applied to the liquid crystal is zero) is used, and as a black spot on the display screen when a normally black mode (a display mode in which the light transmittance is minimum when the voltage applied to the liquid crystal is zero) is used.

If a point defect is detected at the stage of manufacturing the substrate having the switching elements formed thereon, in some cases, the defective pixel can be corrected by a technique such as laser cutting. However, it is quite difficult to detect a point defect among a huge number of pixels during the manufacture of the substrate; practically impossible in the case of mass production, considering time and cost required. Especially, it is completely impossible to detect a point defect when a large-scale display panel including hundreds of thousands of pixels is manufactured.

To cope with the above problems display devices as shown in FIGS. 4 and 6 are proposed (Japanese Laid-Open Patent Publication Nos. 4-16929, 4-16930, 4-19618, and 3-24524), in which an electrical signal for detection is applied to buses at the stage where a substrate having switching elements formed thereon and a counter substrate have been attached together with a liquid crystal sealed therebetween, so that a point defect can be easily detected by visual observation. According to such display devices, the detected defective pixel can be corrected from outside by a technique such as laser cutting.

A conventional display device in FIG. 4 comprises gate buses 21 disposed in one direction on one of paired substrates facing each other and source buses 23 disposed in a direction transverse to the above direction. A pixel electrode 41 is disposed in each rectangular area defined by the adjacent gate buses 21 and the adjacent source buses 23.

A gate bus branch 22 is formed as an extension from the gate bus 21, and comprises a portion functioning as a gate electrode for a TFT 31 and a portion narrower than the above portion. The TFT 31 which functions as a switching element comprises a drain electrode 33 electrically connected to the pixel electrode 41, a source electrode 32 electrically connected to the source bus 23 which are formed over the gate bus branch 22, and the gate electrode of the gate bus branch 22.

In the above-described display device, the detection of a point defect and correction of the defective pixel is performed in the following procedure. The substrate having the TFT 31 formed thereon and the counter substrate are attached together with a liquid crystal sealed therebetween. In this condition, appropriate signals are applied to the gate buses 21, the source buses 23 and a counter electrode formed on the counter substrate, so as to detect any possible point defect by visual observation. When a point defect is detected, the defective pixel is corrected by a technique such as laser cutting.

Referring to FIG. 5, the correction of the defective pixel is performed as follows. First, the narrow portion of the gate bus branch 22 is cut by laser radiation to separate the TFT 31 from the gate bus 21. An area 51 enclosed by a double line in the figure shows the portion radiated by the laser. In this way, the gate electrode of the TFT 31 is electrically disconnected from the gate bus 21.

Subsequently, part of an overlapping portion of the source electrode 32 and the gate electrode of the TFT 31 and part of an overlapping portion of the drain electrode 33 and the gate electrode of the TFT 31, shown as areas 52 and 53 enclosed by double lines in FIG. 5, respectively, are shot through by laser radiation through the transparent substrate. The overlapping electrodes are then electrically connected to each other through the edges of the areas 52 and 53, respectively. More specifically, the source electrode 32 and the gate electrode of the TFT 31, and the drain electrode 33 and the gate electrode of the TFT 31 are electrically connected. This means that the source bus 23 and the pixel electrode 41 are electrically connected through the gate electrode of the TFT 31. Thus, since the pixel electrode 41 is short-circuited with the source bus 23, it keeps the same potential as the source signal. As a result, the point defect becomes unobtrusive, and thus the defective pixel can be corrected.

Another conventional display device shown in FIG. 6 comprises the TFT 31 formed over the gate bus branch 22 extended from the gate bus 21 including a portion of the gate bus branch 22 functioning as a gate electrode, as in the display device shown in FIG. 4. In this case, however, a redundant structure for short-circuiting the pixel electrode 41 with the source bus 23 is additionally formed. The redundant structure comprises an extrusion 46 extended from the source bus 23, a conductive portion 47 overlapping the portion of the extrusion 46, and a conductive piece 48 overlapping the conductive portion 47 and electrically connected to the pixel electrode 41. Insulating films are interposed between the extrusion 46 and the conductive portion 47 and between the conductive portion 47 and the conductive piece 48, so as to be insulated from each other.

Referring to FIG. 7, the detection of a point defect and correction of the defective pixel is performed as follows. At the stage that the substrate having the TFT 31 formed thereon and the counter substrate have been attached together with the liquid crystal sealed therebetween, appropriate signals are applied to gate buses 21, source buses 23 and a counter electrode formed on the counter substrate, so as to detect any possible point defect by visual observation.

When a point defect is detected, part of an overlapping portion of the extrusion 46 of the source bus 23 and the conductive portion 47 and part of an overlapping portion of the conductive portion 47 and the conductive piece 48, shown as areas 54 and 55 enclosed by double lines in FIG. 7, respectively, are shot through by laser radiation through the transparent substrate. In this way, the extrusion 46 and the conductive portion 47, and the conductive portion 47 and the conductive piece 48 are electrically connected. Since the conductive piece 48 has already been electrically connected to the pixel electrode 41, the pixel electrode 41 can be short-circuited with the source bus 23 by the above-described laser radiation at two places, whereby the pixel electrode 41 can keep the same potential as the source signal. As a result, the point defect becomes unobtrusive, and thus the defective pixel can be corrected.

As is apparent from the above description, the conventional display devices are constructed so that the pixel electrode 41 can be short-circuited with the source bus 23 through which signals are applied to the pixel electrode 41, thereby to make a point defect unobtrusive and thus to correct the defective pixel.

In the above-described display devices, however, the correction of a leakage between the source bus 23 and the pixel electrode 41 may not be possible depending on the place where the leakage occurs. For example, as shown in FIG. 8, when a leakage occurs between the pixel electrode 41 and the source bus 23 through which signals are applied to the pixel electrode 41 at a portion 81 shown by slant lines, a current flows from the pixel electrode 41 to the source bus 23 when the TFT 31 is off. As a result, a pixel with the pixel electrode 41 is recognized as a point defect on the display. In this case, such a defective pixel can be corrected by short-circuiting the pixel electrode 41 with the source bus 23 by the laser radiation onto the TFT 31 as described above.

However, a problem arises when a leakage occurs between the pixel electrode 41 and the source bus 23 through which signals are not applied to the pixel electrode 41 at a portion 82 shown by slant lines. When the laser processing as described above is performed on the portions of the TFT 31, a leakage occurs between the pixel electrode 41 and the source bus 23 through which signals are applied, in addition to the leakage between the pixel electrode 41 and the source bus 23 through which signals are not applied to the pixel electrode 41. This means that a leakage between the adjacent source buses 23 occurs through the pixel electrode 41. As a result, signals passing in the adjacent source buses 23 are mixed with each other through the pixel electrode 41. This produces a line defect, which is more serious than the point defect.

The same problem, (i,e, a line defect) occurs for the device shown in FIG. 6 when a leakage occurs between the pixel electrode 41 and the source bus 23 as described above.

SUMMARY OF THE INVENTION

The active matrix display device of this invention, which overcomes the above-discussed and numerous other disadvantages and deficiencies of the prior art, comprises a pair of insulating substrates at least one of which is transparent, a display medium sealed between the insulating substrates, the optical properties of the display medium being modulated corresponding to an applied voltage, a plurality of scanning lines formed on one of the insulating substrates, a plurality of signal lines formed so as to cross the scanning lines on the insulating substrate, two pixel electrodes disposed in each rectangular area defined by the adjacent scanning lines and the adjacent signal lines, and switching elements connecting the pixel electrodes to the scanning lines and the signal lines;

wherein the pixel electrodes are disposed in pairs across each signal line, and the switching elements respectively connected to the paired pixel electrodes are connected to the common scanning line and the common signal line, and wherein each switching element is formed above or below a scanning line branch extended from the scanning line including a portion of the scanning line branch, a signal electrode of the switching element is disposed so as to overlap the scanning line branch with the insulating film therebetween, and an electrode portion constituting the switching element and electrically connected to each pixel electrode is disposed so as to overlap the scanning line branch with the insulating film therebetween.

In a preferred embodiment, the scanning line branch has a narrow portion between the branch point from the scanning line and the portion where the switching element is formed, the narrow portion having such a width that the scanning line branch can be easily cut at that portion.

In a preferred embodiment, the width is 5 to 15 $\mu$m.

According to another aspect of the present invention, the active matrix display device comprises a pair of insulating substrates at least one of which is transparent, a display medium sealed between the insulating substrates, the optical properties of the display medium being modulated corresponding to an applied voltage, a plurality of scanning lines formed on one of the insulating substrates, a plurality of signal lines formed so as to cross the scanning lines on the insulating substrate, two pixel electrodes disposed in each rectangular area defined by the adjacent scanning lines and the adjacent signal lines, and switching elements connecting the pixel electrodes to the scanning lines and the signal lines;

wherein the pixel electrodes are disposed in pairs across each signal line, and the switching elements respectively connected to the paired pixel electrodes are connected to the common scanning line and the common signal line, wherein each switching element is formed above or below a scanning line branch extended from the scanning line including a portion of the scanning line branch, a signal electrode of the switching element is disposed so as to overlap the scanning line branch with the insulating film therebetween, and an electrode portion constituting the switching element and electrically connected to each pixel electrode is disposed so as to overlap the scanning line branch with the insulating film therebetween, and wherein the active matrix display device further comprises a conductive piece electrically connected to each pixel electrode, and a conductive portion disposed so as to overlap the conductive piece at one end and the signal line at the other end with an insulating film therebetween.

Thus, the present invention makes possible the objectives of providing an active matrix display device capable of (1) easily correcting a defective pixel and (2) preventing an occurrence of a line defect.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
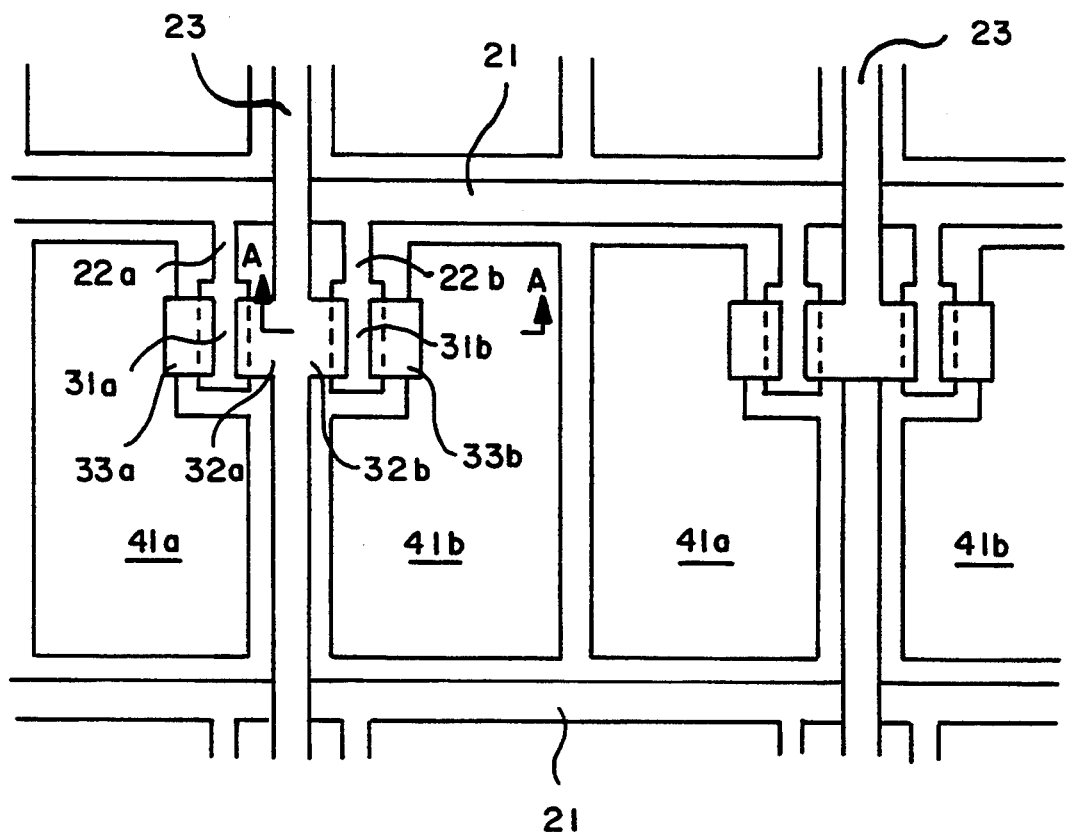
FIG. 1 is a plan view of an active matrix display device according to the present invention.
Figure 2:
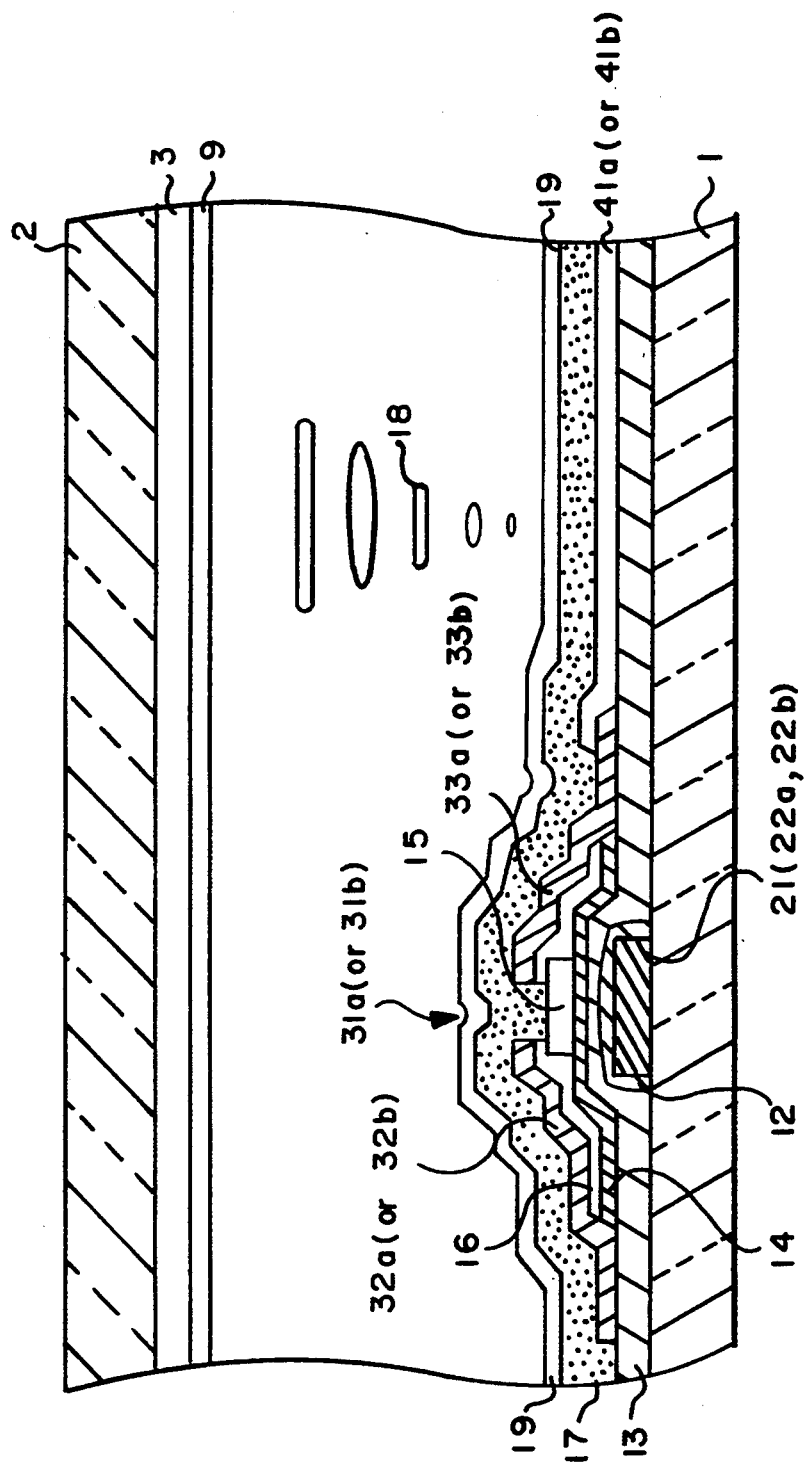
FIG. 2 is a sectional view of the active matrix display device taken along a line A—A of FIG. 1.

Referring to FIGS. 1 and 2, an active matrix display device according to the present invention comprises a pair of transparent insulating substrates 1 and 2 and a liquid crystal 18 sealed therebetween. On the insulating substrate 1, a plurality of gate buses 21 which function as scanning lines and a plurality of source buses 23 which function as signal lines are formed so as to cross each other. Two pixel electrodes 41a and 41b are disposed in each rectangular area defined by the adjacent gate buses 21 and the adjacent source buses 23, and thus a plurality of pixel electrodes 41a and 41b are arranged in a matrix.

Gate bus branches 22a and 22b are formed as extensions of the gate bus 21, and over the end portions of the gate bus branches 22a and 22b including the end portions thereof functioning as gate electrodes, TFTs 31a and 31b are formed as switching elements, respectively. The portions of the gate bus branches 22a and 22b between the branch points from the gate bus 21 and the portions where the TFTs 31a and 31b are formed have a width narrow enough to be easily cut by radiation of a light energy, preferably a width of 5 to 15 μm. In this example, the width was 10 μm. The TFTs 31a and 31b are connected to the pixel electrodes 41a and 41b, respectively.

In the above structure, a signal passing in one of the source buses 23 is applied to the pixel electrodes 41a and 41b disposed across the source bus 23 through the corresponding TFTs 31a and 31b. In other words, the pixel electrodes 41a and 41b adjacent to each other with the source bus 23 interposed therebetween constitute a pair of pixel electrodes which provide the same display.

The structure of the display device of the present invention will be described in detail in accordance with the manufacturing process thereof. Referring to FIG. 2 which is a sectional view taken along a line A—A in FIG. 1, metal such as Ta, Ti, Al and Cr was first deposited in a single layer or in multiple layers on the transparent insulating substrate by a sputtering method and then patterned to form the gate bus 21. The gate bus branch 22a(22b) was also formed simultaneously with the gate bus 21. In this example, glass was used for the transparent insulating substrate 1. An insulating film made of $Ta_2O_5$, etc. may be formed as a base coat film under the gate bus 21.

Then, a gate insulating film 13 was formed over the gate bus 21 and the gate bus branch 22a(22b). In this example, $SiN_X$ was deposited to a thickness of 300 nm as the gate insulating film 13 by a plasma CVD method. Before the gate insulating film 13 is formed, an oxide film 12 may be formed by anodic oxidation of the gate bus 21. For example, when the gate bus 21 is made of Ta, the oxide film 12 made of $Ta_2O_5$ will be formed.

Next, a semiconductor layer 14 and an etching stopper layer 15 were consecutively formed on the gate insulating film 13. The semiconductor layer 14 was formed by depositing amorphous silicon (a-Si) to a thickness of 30 nm by the plasma CVD method and patterning, and the etching stopper layer 15 was formed by depositing $SiN_X$ to a thickness of 200 nm by the plasma CVD method and patterning. Then, silicon with phosphorus added thereto was deposited over the above layers to a thickness of 80 nm by the plasma CVD method and patterned to form an n+-type a-Si layer 16. The n+-type a-Si layer 16 was formed to provide a favorable ohmic contact of the semiconductor layer 14 with a source electrode 32a(32b) and a drain electrode 33a(33b) to be formed on the n+-type a-Si layer 16.

A metal such as Ti, Al, Mo, or Cr, generally, was then deposited over the n+-type a-Si layer 16 by the sputtering method and patterned to form the source electrode 32a(32b) and the drain electrode 33a(33b). In this example, Ti was used. In this way, the TFT 31 having the structure as shown in FIG. 2 was formed.

Subsequently, a transparent conductive substance was deposited by the sputtering method and patterned to form the pixel electrode 41a(41b). In this example, ITO (indium tin oxide) was used as the transparent conductive substance. As shown in FIG. 1, two pixel electrodes 41a and 41b are formed in each rectangular area defined by the adjacent gate buses 21 and the adjacent source buses 23, and the pixel electrodes 41a and 41b adjacent to each other with the source bus 23 therebetween constitute a pair of pixel electrodes effecting the same display. As shown in FIG. 2, the end portion of the pixel electrode 41a(41b) was formed to overlap the end portion of the drain electrode 33a(33b) of the TFT 31a(31b), so that the pixel electrode 41a(41b) is electrically connected to the drain electrode 33a(33b).

Then, $SiN_X$ was deposited over the entire surface of the glass substrate 1 on which the pixel electrode 41a(41b) had been formed, so as to form a protective film 17. The protective film 17 may be partly removed in the portion corresponding to the center portion of the pixel electrode 41a(41b) to form a window. An orientation film 19 was then formed on the protective film 17. The orientation film 19 may also be partly removed in the portion corresponding to the center portion of the pixel electrode 41a(41b). As shown in FIG. 2, on the glass substrate 2 facing the glass substrate 1, a counter electrode 3 and an orientation film 9 were formed. These glass substrates 1 and 2 were attached together with the liquid crystal 18 sealed therebetween, thus completing the active matrix display device of this example.

In the active matrix display device having the above-described structure, a defective pixel can be easily corrected, and furthermore, a line defect which may occur following the correction of the defective pixel can be prevented. That is, each of the pixel electrodes 41a and 41b has only one source bus 23 formed on one side thereof through which signals are applied thereto, not having two source buses 23 on both sides thereof as the conventional display devices. Therefore, a line defect will not be produced by the laser processing on the TFT 31a or 31b to correct a defective pixel.

Figure 5:
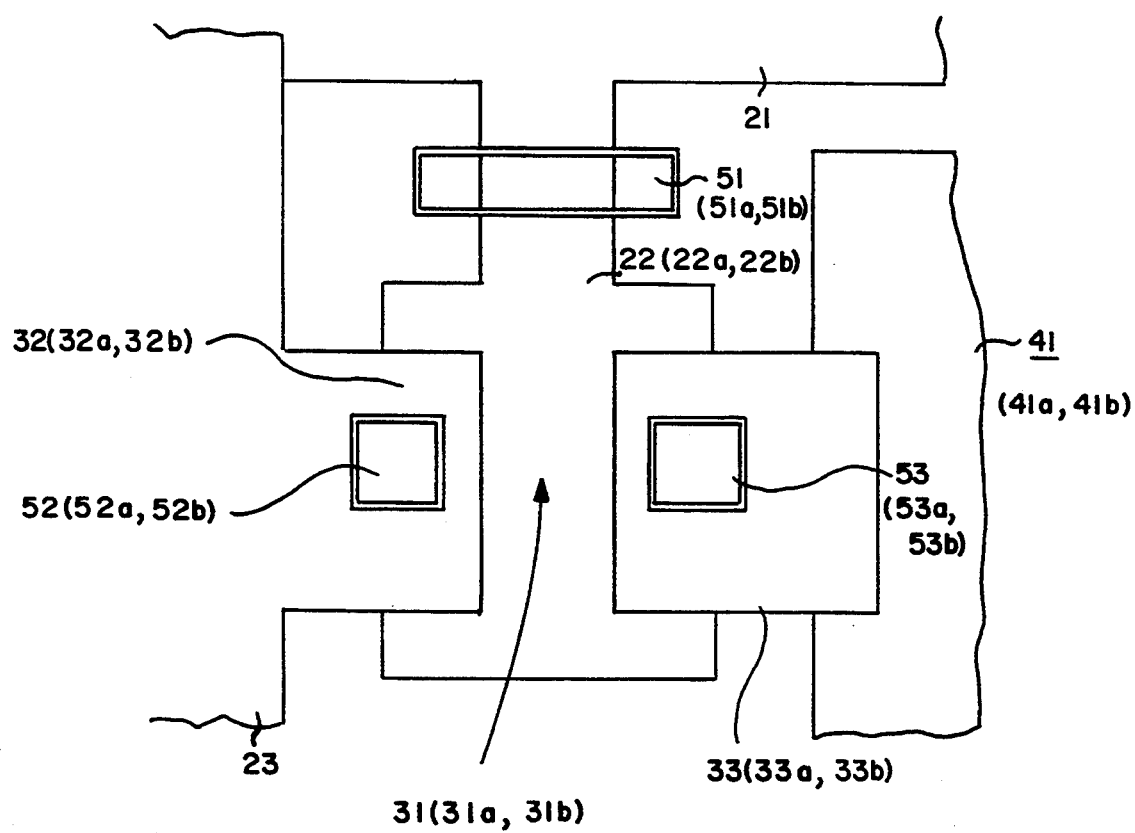
FIG. 5 is a plan view showing the correction portions on the active matrix display device of FIG. 1 or FIG. 4.
Figure 6:
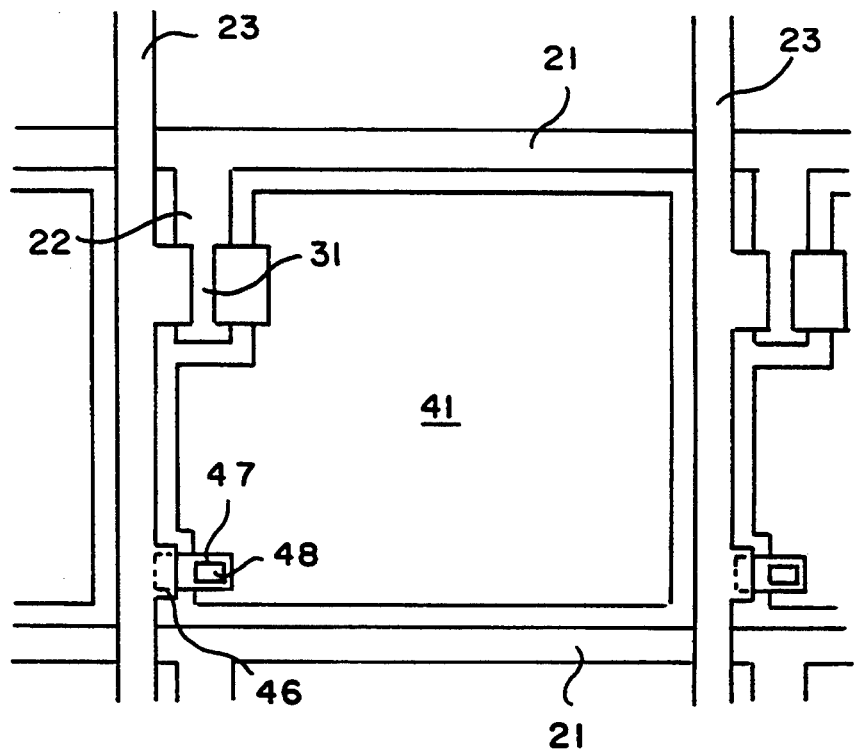
FIG. 6 is a plan view of another conventional active matrix display device.

When a point defect occurs, the correction of the defective pixel can be made as in the conventional procedure shown in FIG. 5. That is, a YAG laser light, for example, is radiated to an area 51a(51b) enclosed by a double line so as to disperse the metal of the narrow portion of the gate bus branch 22a(22b). In this way, the gate bus 21 and the gate bus branch 22a(22b) are electrically disconnected from each other.

Then, the laser light is radiated to an area 52a(52b) enclosed by a double line, so as to break the source electrode 32a(32b), the gate bus branch 22a (22b) which is a gate electrode of the TFT 31a(31b), and the gate insulating film 13 formed therebetween within the area 52a(52b), thereby short-circuiting the source electrode 32a(32b) with the gate electrode of the TFT 31a(31b). Finally, the laser light is radiated to an area 53a(53b) enclosed by a double line, so as to break the drain electrode 33a(33b), the gate bus branch 22a(22b) which is a gate electrode of the TFT 31a(31b), and the gate insulating film 13 formed therebetween within the area 53a(53b), thereby short-circuiting the drain electrode 33a(33b) with the gate electrode of the TFT 31a(31b).

By these short-circuits, the pixel electrode 41a(41b) can keep the same potential as the source signal. As a result, the defective pixel can be lightened to an average brightness of all pixels, and therefore the point defect becomes unobtrusive on the display. Thus, the defective pixel can be corrected.

The order of the laser radiation to the areas 51a(51b), 52a(52b), and 53a(53b) is not limited to that described above. Also, the positions of the areas 51a(51b), 52a(52b), and 53a(53b) are not limited to those shown in FIG. 5. For example, the areas 52a(52b) and 53a(53b) can be any portion where the conductive metals overlap each other.

The laser radiation can be made either from the side of the substrate 1 where the TFTs 31a and 31b are formed or from the side of the substrate 2 where the counter electrode is formed. In this example, since the surface of the substrate 2 is covered with a light-shading metal blocking direct radiation of the laser light, the laser radiation was made from the side of substrate 1.

EXAMPLE 2

Figure 3:
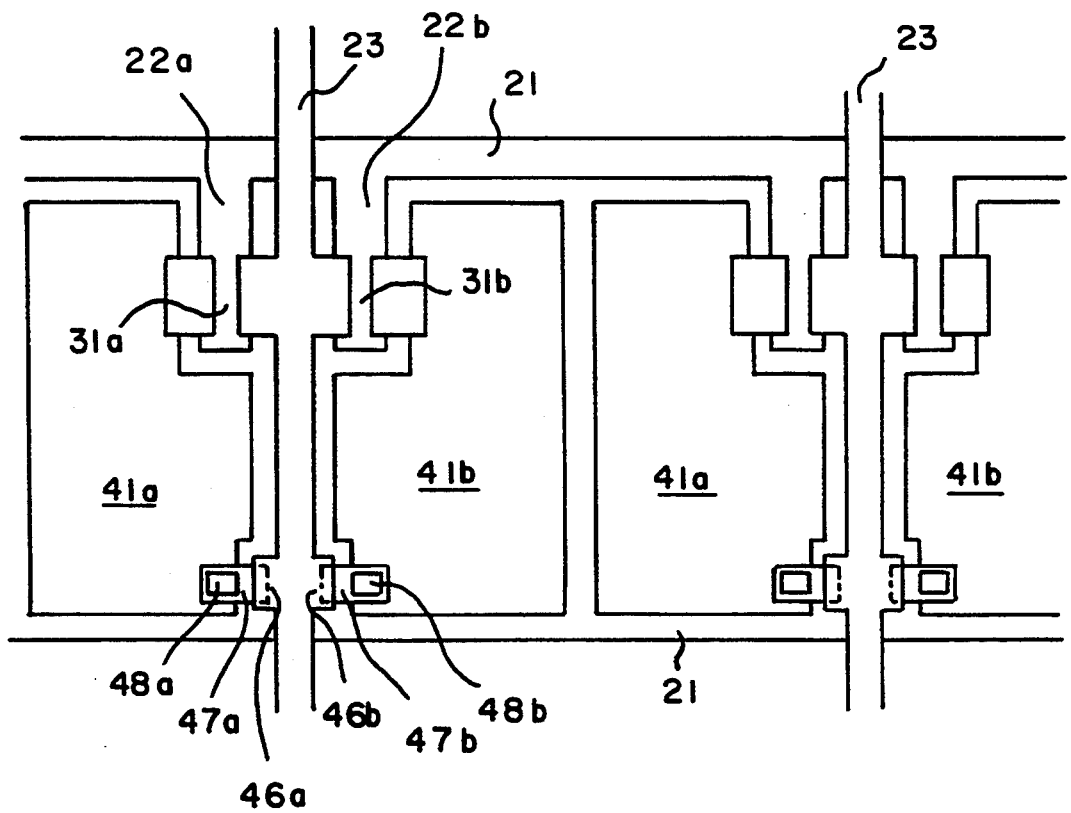
FIG. 3 is a plan view of another active matrix display device according to the present invention.
Figure 4:
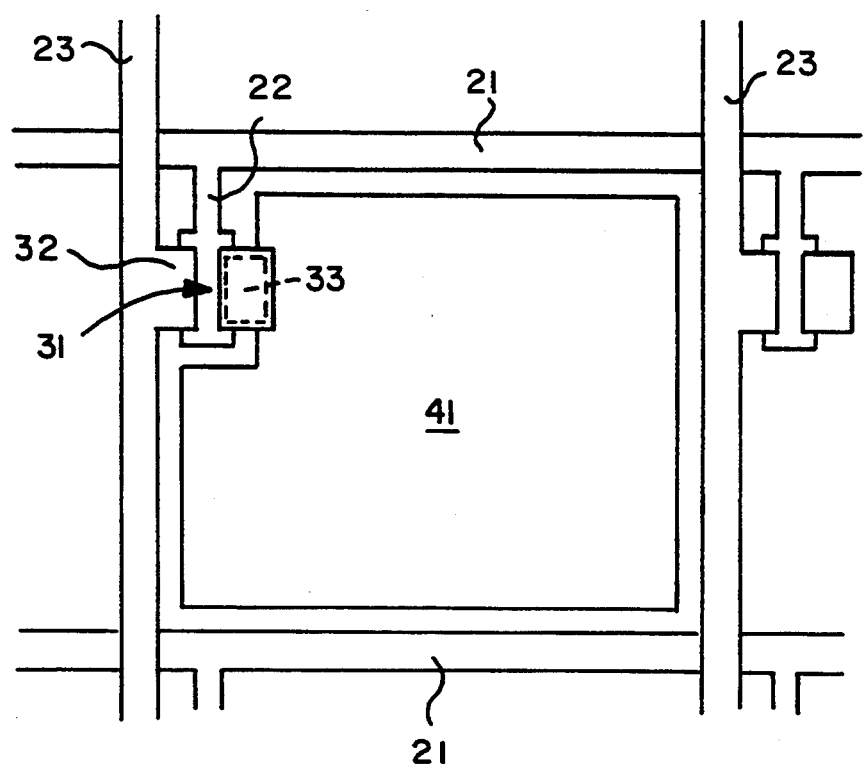
FIG. 4 is a plan view of a conventional active matrix display device.

Referring to FIG. 3, a second example of the active matrix display device according to the present invention has the same structure as that of Example 1, except for an additional redundant structure which is disposed on corner portions of the pixel electrodes 41a and 41b for the specific purpose of short-circuiting the pixel electrodes 41a and 41b with the source bus 23.

Unlike Example 1, the gate bus branches 22a and 22b of this example have a uniform width throughout the length thereof. This is because, in this example, it is not necessary to cut a portion of the gate bus branches 22a and 22b since the pixel electrodes 41a and 41b are provided with the redundant structure. The redundant structure comprises extrusions 46a and 46b extruding to the opposite sides from the source bus 23, conductive portions 47a and 47b formed to overlap the portion of the extrusions 46a and 46b with an insulating film therebetween, respectively, and conductive pieces 48a and 48b formed to overlap the conductive portions 47a and 47b and electrically connected to the pixel electrodes 41a and 41b with an insulating film therebetween, respectively.

Accordingly, in this example, as in Example 1, each of the pixel electrodes 41a and 41b has only one source bus 23 formed on one side thereof through which signals are applied thereto. Therefore, a line defect will not be produced by laser processing on the TFT 31a or 31b to correct a defective pixel. When a point defect occurs, the correction can be made by laser processing of the redundant structure.

Figure 7:
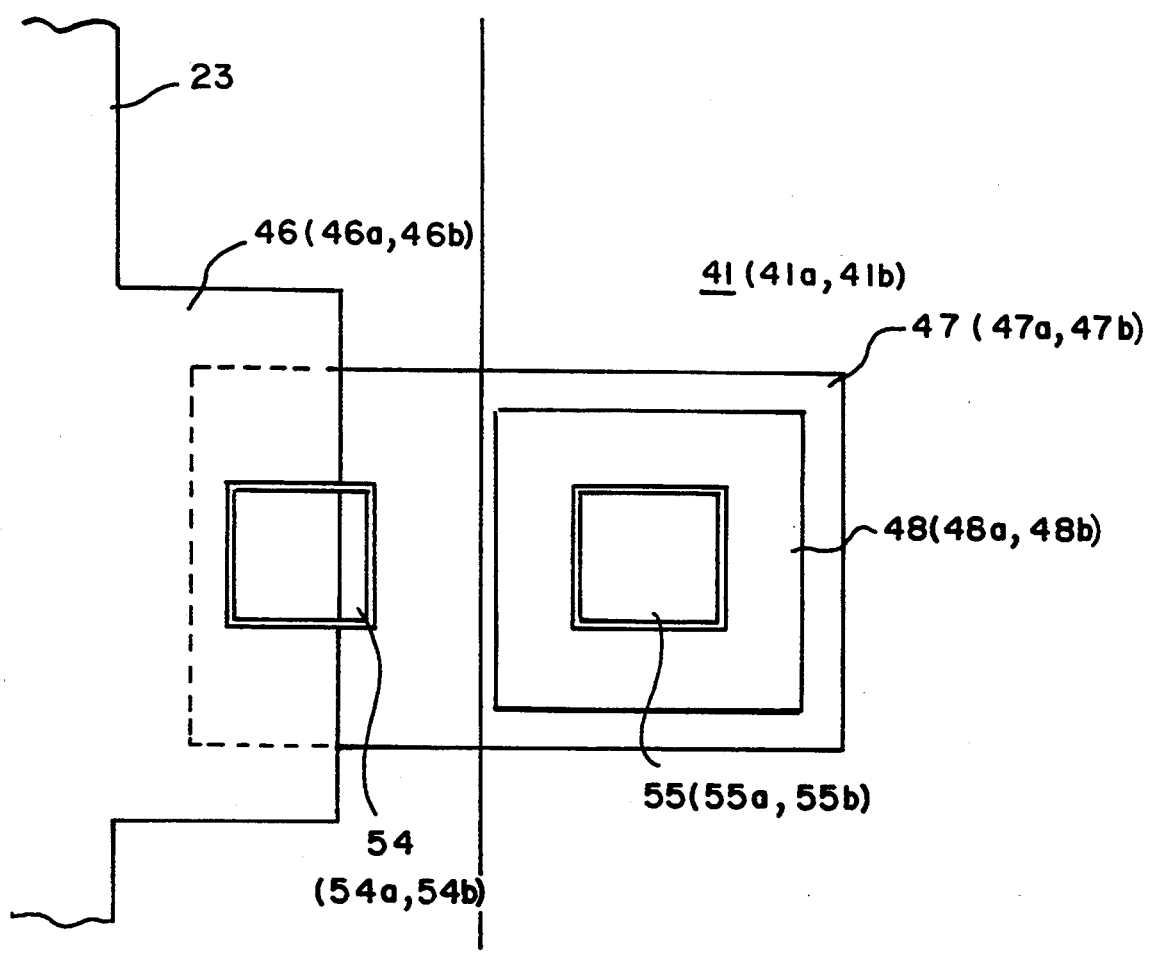
FIG. 7 is a plan view showing the correction portions on the active matrix display device of FIG. 3 or FIG. 6.
Figure 8:
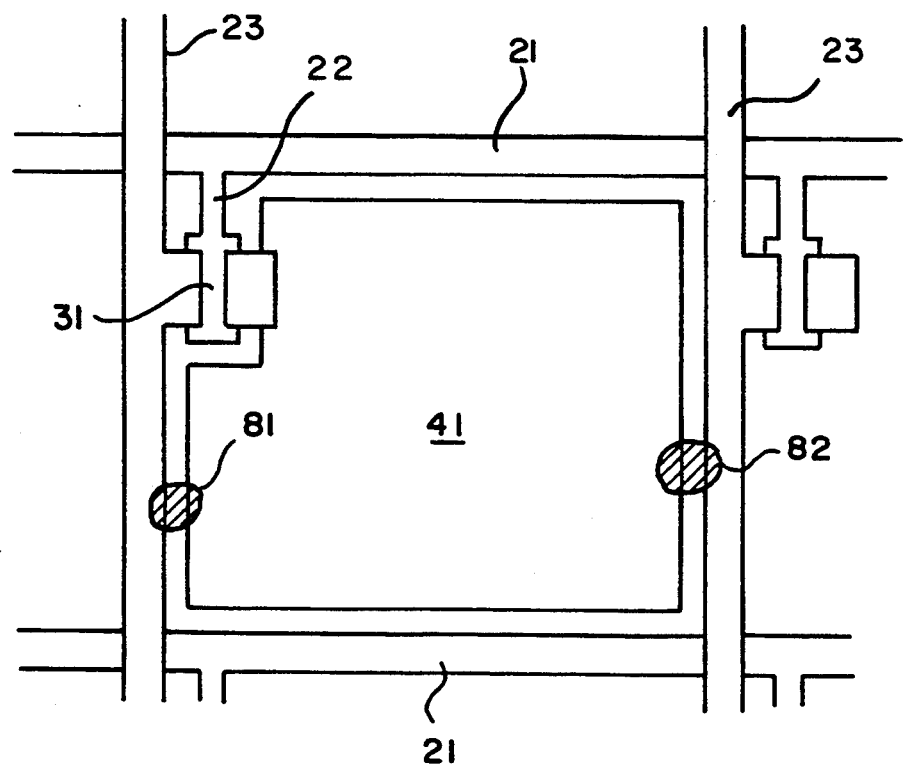
FIG. 8 is a plan view of a conventional active matrix display device in the state where a leakage has occurred between a source bus and a pixel electrode in two cases.

Practically, as in the conventional procedure shown in FIG. 7, part of an overlapping portion of the extrusion 46a(46b) of the source bus 23 and the conductive portion 47a(47b), shown as an area 54a(54b) enclosed by a double line, is irradiated with laser light through the transparent substrate so as to break the extrusion 46a(46b), the conductive portion 47a(47b), and the insulating film therebetween within the area 54a(54b), thereby short-circuiting the extrusion 46a(46b) with the conductive portion 47a(47b). Then, part of an overlapping portion of the conductive portion 47a(47b) and the conductive piece 48a(48b), shown as an area 55a(55b), is irradiated with laser light through the transparent substrate so as to break the conductive piece 48a(48b), the conductive portion 47a(47b), and the insulating film therebetween within the area 55a(55b), thereby shortcircuiting the conductive portion 47a(47b) with the conductive piece 48a(48b). Since the conductive piece 48a(48b) has been electrically connected to the pixel electrode 41a(41b), the pixel electrode 41a(41b) can be short-circuited with the source bus 23 by the above laser radiation at two places, thereby keeping the same potential as the source signal. As a result, the defective pixel can be lightened to an average brightness of all pixels, and therefore the point defect becomes unobtrusive on the display. Thus, the defective pixel can be corrected.

The order of the laser radiation to the areas 54a(54b) and 55a(55b) is not limited to that described above. Also, the positions of the areas 54a(54b) and 55a(55b) are not limited to those shown in FIG. 7. For example, the areas 54a(54b) and 55a(55b) can be any portion where the conductive metals overlap each other.

Various modifications are possible to the above examples. For example, the present invention is also applicable to a display device provided with an additional capacitance electrode. Also, the switching element which drives the pixel electrode is not limited to the TFT, but other elements such as MIM elements, MOS transistors, diodes, and varistors can also be used. The structure of the TFT is not limited to that of the above examples, but the source bus can be formed on a lower position than the gate bus.

According to the active matrix display device of the present invention, two pixel electrodes are provided between the adjacent signal lines, and two pixel electrodes adjacent to each other with each signal line therebetween are paired. The paired pixel electrodes are connected to respective switching elements which are connected to the common scanning line and the common signal line. In this structure, each pixel electrode has only one signal line adjacent thereto.

Therefore, a leakage conventionally occurring between a pixel electrode and a signal line which is adjacent to the pixel electrode but through which signals are not applied to the pixel electrode can be prevented, whereby a leakage between the adjacent source buses 23 will not occur when a defective pixel is corrected. Furthermore, the same signals are applied to the paired pixel electrodes, and therefore, even if one of the pixel electrodes can not effect a display, at least the other pixel electrode can effect a display.

When a point defect occurs, a portion of the scanning line branch between the branch point from the scanning line and the switching element is irradiated with a light energy to cut the portion, thereby electrically disconnecting the pixel electrode from the scanning line.

Then, part of the overlapping portion of the signal electrode extended from the signal line and the scanning line branch with the insulating film therebetween, and part of the overlapping portion of the scanning line branch and the electrode portion constituting the switching element and electrically connected to the pixel electrode with the insulating film therebetween are short-circuited. In this way, the pixel electrode and the signal line through which signals are applied to the pixel electrode are electrically connected, whereby the defective pixel can be corrected. At this correction of the defective pixel, a leakage between the signal lines will not occur, and therefore an occurrence of a line defect is prevented.

Incidentally, when the portion of the scanning line branch between the branch point from the scanning line and the switching element is narrow enough to be easily cut by radiation of a light energy, the scanning line and the switching element can be easily electrically disconnected.

In the case of the display device comprising the redundant structure, part of the overlapping portion of the conductive portion and the signal line with the insulating film therebetween and part of the overlapping portion of the conductive portion and the conductive piece electrically connecting to the pixel electrode with the insulating film therebetween are short-circuited. In this way, the pixel electrode and the signal line through which signals are applied to the pixel electrode are electrically connected without intervention of the switching element, thereby allowing a defective pixel to be corrected. Accordingly, according to the present invention, the display devices can be manufactured with a high yield, thereby reducing the manufacturing cost.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing one or more of the features of patentable novelty that reside in the present invention, including all features that would be treated as equivalents thereof by those skilled in the art to which this invention pertains.

What is claimed is:

1. An active matrix display device comprising a pair of insulating substrates at least one of which is transparent, a display medium sealed between the insulating substrates, the optical properties of the display medium being modulated corresponding to an applied voltage, a plurality of scanning lines formed on one of the insulating substrates, a plurality of signal lines formed so as to cross the scanning lines on the insulating substrate, two pixel electrodes disposed in each rectangular area defined by the adjacent scanning lines and the adjacent signal lines, and switching elements connecting the pixel electrodes to the scanning lines and the signal lines;

wherein the pixel electrodes are disposed in pairs across each signal line, and the switching elements respectively connected to the paired pixel electrodes are connected to the common scanning line and the common signal line, and wherein each switching element is formed above a scanning line branch extending from the scanning line including a portion of the scanning line branch, a signal electrode of the switching element is disposed so as to overlap the scanning line branch with the insulating film therebetween, and an electrode portion constituting the switching element and electrically connected to each pixel electrode is disposed so as to overlap the scanning line branch with the insulating film therebetween, and further wherein said scanning line branch and said switching element constitute a repair structure for a defective connection between said switching element and said pixel electrode, by cutting said scanning line branch, and by short-circuiting said two overlapping electrode portions of said switching element, thereby electrically connecting said pixel electrode to said common signal line.

2. An active matrix display device according to claim 1, wherein the scanning line branch has a narrow portion between the branch point from the scanning line and the portion where the switching element is formed, the narrow portion having such a width that the scanning line branch can be easily cut at that portion.

3. An active matrix display device according to claim 1, wherein the width is 5 to 15 μm.

4. An active matrix display device comprising a pair of insulating substrates at least one of which is transparent, a display medium sealed between the insulating substrates, the optical properties of the display medium being modulated corresponding to an applied voltage, a plurality of scanning lines formed on one of the insulating substrates, a plurality of signal lines formed so as to cross the scanning lines on the insulating substrate, two pixel electrodes disposed in each rectangular area defined by the adjacent scanning lines and the adjacent signal lines, and switching elements connecting the pixel electrodes to the scanning lines and the signal lines;

wherein the pixel electrodes are disposed in pairs across each signal line, and the switching elements respectively connected to the paired pixel electrodes are connected to the common scanning line and the common signal line, wherein each switching element is formed above or below a scanning line branch extending from the scanning line including a portion of the scanning line branch, a signal electrode of the switching element is disposed so as to overlap the scanning line branch with the insulating film therebetween, and an electrode portion constituting the switching element and electrically connected to each pixel electrode is disposed so as to overlap the scanning line branch with the insulating film therebetween, and wherein the active matrix display device further comprises a conductive portion, one end of said conductive portion is overlapping the pixel electrode with an insulating film and conductive piece therebetween, and the other end of said conductive portion is overlapping a projection portion of the signal line with an insulating film therebetween which acts as a repair structure for a defective connection between said switching element and said pixel electrode, by short-circuiting said two overlapping portions of said conductive portion, thereby electrically connecting said pixel electrode to said common signal line, whereby the pixel is lightened to an average brightness of all pixels connected with said signal line.

5. A method of fabricating and repairing a liquid crystal display, the method comprising:

forming at least two source buses on a first of a pair of insulating substrates, the sources buses being formed parallel to one another;

forming at least two scanning lines on the first of the insulating substrates, the scanning lines being parallel to one another and substantially orthogonal to the source buses;

forming a pair of pixel electrodes in a region bordered by a first and a second of the source buses and by a first and a second of the scanning lines;

forming a first switching device for driving a first pixel electrode of the pixel electrode pair and a second switching device for driving a second pixel electrode of the pixel electrode pair, the first switching device serving to drive the first pixel electrode of the pair when a source signal is carried on the first of the source buses and a scanning signal is carried on the first of the scanning lines, the second switching device serving to drive the second pixel electrode of the pair when a source signal is carried on the second of the source buses and a scanning signal is carried on the first of the scanning lines;

determining whether a defect exists in the first pixel electrode of the pair and, if the defect exists;

shortcircuiting the first pixel electrode of the pair to the first source bus.

* * * * *